(12) United States Patent
Deckert et al.

(10) Patent No.: US 6,490,772 B2
(45) Date of Patent: Dec. 10, 2002

(54) METHOD FOR MAKING A SKIP BODY WITH A CONCAVE CROSS SECTION

(75) Inventors: Serge Deckert, Mundolsheim (FR); Jean-Luc Andre, Obernai (FR)

(73) Assignee: Lohr Industrie, Hangenbieten (FR)

( * ) Notice: Subject to any disclaimer, the term of this patent is extended or adjusted under 35 U.S.C. 154(b) by 0 days.

(21) Appl. No.: 09/142,127

(22) PCT Filed: Feb. 27, 1997

(86) PCT No.: PCT/FR97/00345

§ 371 (c)(1),
(2), (4) Date: Sep. 11, 1999

(87) PCT Pub. No.: WO97/31728

PCT Pub. Date: Sep. 4, 1997

(65) Prior Publication Data

US 2002/0124370 A1 Sep. 12, 2002

(30) Foreign Application Priority Data

Mar. 1, 1996 (FR) .............................................. 96 02848

(51) Int. Cl.⁷ ................................................ B21C 37/30
(52) U.S. Cl. ........................................... 29/90.7; 29/446
(58) Field of Search ........................... 244/120; 72/296, 72/297, 295, 379.2, 166; 29/90.7, 446; 296/184, 181, 183

(56) References Cited

U.S. PATENT DOCUMENTS

| 1,805,489 | A | * | 1/1931 | Kerr et al. ................... 296/184 |
| 1,937,663 | A | * | 12/1933 | Norton |
| 2,825,385 | A | * | 3/1958 | Allen ........................... 72/296 |
| 2,911,030 | A | * | 11/1959 | Kocks ........................... 72/166 |
| 3,021,887 | A | * | 2/1962 | Maynard ..................... 72/297 |
| 3,575,031 | A |   | 4/1971 | Gray ........................... 72/302 |
| 4,236,399 | A | * | 12/1980 | Williams et al. ............... 72/295 |
| 5,072,606 | A | * | 12/1991 | Koehler et al. ............... 29/90.7 |
| 5,327,764 | A | * | 7/1994 | Weykamp ..................... 72/296 |
| 5,482,356 | A |   | 1/1996 | Goodson, Jr. ............ 295/22 AE |
| 5,701,780 | A | * | 12/1997 | Ver Meer ................... 72/379.2 |
| D403,651  | S | * | 1/1999 | Reiter |
| 5,906,417 | A | * | 5/1999 | Golden ....................... 296/184 |
| 6,076,693 | A | * | 6/2000 | Reiter et al. |

FOREIGN PATENT DOCUMENTS

| FR | 1.087.985 |   | 9/1954 |   |
| FR | 1.308.612 |   | 10/1962 |   |
| SU |   698696  | * | 12/1979 | ................ 72/379.2 |

* cited by examiner

Primary Examiner—David P. Bryant
Assistant Examiner—Steve Blount
(74) Attorney, Agent, or Firm—Davis & Bujold, P.L.L.C.

(57) ABSTRACT

A method for forming a one-piece skip body with a concave cross section from a large metal sheet (1) by imparting an approximate cross section to the sheet using shaping mechanisms (2) is disclosed. According to the method, the approximate cross section is maintained while a sealing plate (10) is secured to one end (9) and a stiffening reinforcement member (13) shaped according to the final cross section is attached to the other end (12). The longitudinal edges are stiffened then the most curved areas are mechanically treated and the shaping mechanisms (2) are released. The method is relevant to skip manufacturers and more generally to builders of utility vehicles.

21 Claims, 7 Drawing Sheets

METHOD FOR MAKING A SKIP BODY WITH A CONCAVE CROSS SECTION

The invention concerns a method for manufacturing a concave skip body, or more specifically, a skip body with a concave cross section and a continuous inwardly curved base from one large sheet of metal, thereby allowing unitary construction.

BACKGROUND OF THE INVENTION

Concave skip bodies are presently shaped by bending. The concave shape of the transverse section results from performing a succession of longitudinal bending operations which impart a polygonal shape to the body.

This succession of creases is unsatisfactory for several reasons.

First, the interior structure of a shaped skip body which is in contact with the cargo should be as smooth as possible, with no bulging areas to attract residue which could adhere to the metal when freight is discharged and adversely affect wear over time. It is preferable for no residue to remain on the structure, since it could interact with the next shipment to be transported.

Furthermore, the utmost care is required when bending certain metals such as aluminum.

Moreover, other metals of interest, such as highly flexible steel known as HLE or THLE, will not maintain a definitive form unless they are bent into shape. The use of such metals is particularly exacting when shaping long objects that are hard to form of one piece, such as skip bodies. Large sheets of these metals have proven extremely difficult, if not impossible, to shape in any way other than by bending them on forms designed to interlock in the same way a skip body fits onto its complementary cradle receptor.

In addition, because of these complementary shapes, the creases in the skip body and in the cradle must be perfectly concentric. This technique requires the use of precise machinery that is very cumbersome.

Thus, the only choices remaining are to either use smaller dimensions or continue using the bending technique despite its many disadvantages.

However, the metals discussed above also have many qualities that make them preferable to conventional metals.

Practically speaking, because of its lower density, a vehicle using aluminum can carry a heavier load. For this reason many transport vehicles already use trailers, semi-trailers and skip bodies made primarily of aluminum.

These skip bodies are all conventionally designed and are generally rectangular in shape, with multiple reinforcing structures.

For other reasons, highly flexible steel is one of the preferred metals for constructing skip bodies.

While there is a serious risk that aluminum will fissure when creased, highly flexible steel is also very unsuitably for bending and is actually so resistant that it is impossible to bend using present methods.

However, both highly flexible steel known by the acronym HLE and very highly flexible steel known as THLE offer two advantages that make them very desirable for skip body construction: they are highly mechanically resistant to shocks and punctures, a quality which is particularly useful for skip bodies transporting heavy loads, minimizing the risk of damage when heavy freight is discharged and performing well in nearly any application; the steel is highly resistant to abrasion.

The high resistance of this metal provides greater weight while at the same time decreasing cost, since thinner metal can be used.

However, these same advantages precipitate manufacturing problems.

The flexible steel has a spring-like quality which not only resists precise formation into such a definitive, unnatural, shape, but also resists maintaining the curved shape.

The specific problem addressed here is how to achieve an industrial process for manufacturing skip bodies with a consistent inwardly curved, continuously convex shape, essentially semi-elliptical, with a certain degree of precision and using a reproducible operation.

SUMMARY OF THE INVENTION

The present invention relates to an industrial process for manufacturing a skip body from a single sheet of metal or several adjacent sheets seamed either longitudinally or transversely, manipulated and shaped as a single element.

More specifically, the invention relates to a method for forming a skip body from a large sheet of metal with a continuously curved, concave cross-section without creasing it, characterized by the following steps: a large sheet (1) of metal is prepared from one piece or several joined pieces; the single sheet (1) of metal is curved inwardly using maintenance means (4, 5) into a cross section approximating the definitive shape desired for the ultimate shape of the body (3) of the skip; a sealing plate (10) is secured to one of the extremities (9) of the skip body, the contours (11) of which have the exact concave shape to be obtained, by gradually applying the edges of the opening of this end of the metal sheet against the cut edges of sealing plate (10) during the installation process; the opposed extremity (12) of the skip body is stiffened by means of a stiffening member (13) according to the definitive shape to be reached; the stiffening of its longitudinal edges is longitudinal edges is performed either before or after the metal is curved inwardly; the pressure of the maintenance means is relaxed and the skip body (3) is disengaged, having assumed its definitive shape.

The present invention makes is possible to fabricate a concave skip body that is continuously curved, with no creases, from a large sheet of any type of metal suitable for manufacturing skips, and more specifically from any of the preferred metals such as aluminum and highly flexible steel.

BRIEF DESCRIPTION OF THE DRAWINGS

Other features and advantages of the invention will be apparent from the following description, provided as an example, and with reference to the drawings, wherein.

DESCRIPTION OF THE PREFERRED EMBODIMENTS

Figure 1:
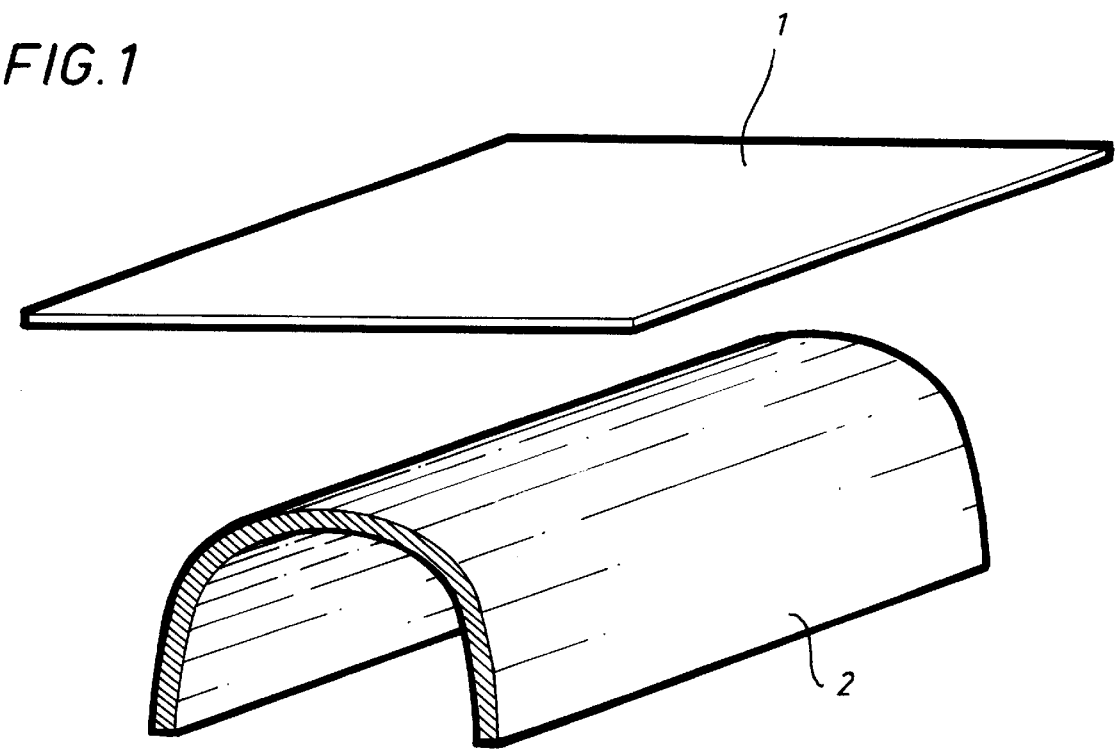
FIGS. 1 through 5 are schematic illustrations of a first method of application to a convex form.
Figure 2:
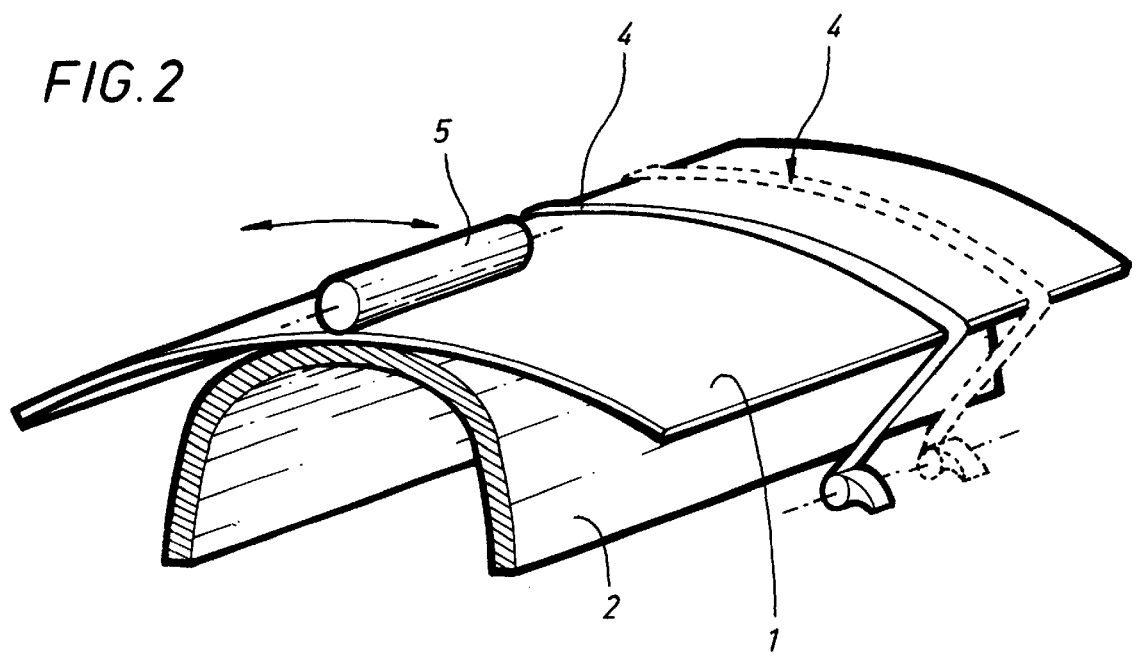
Figure 3:
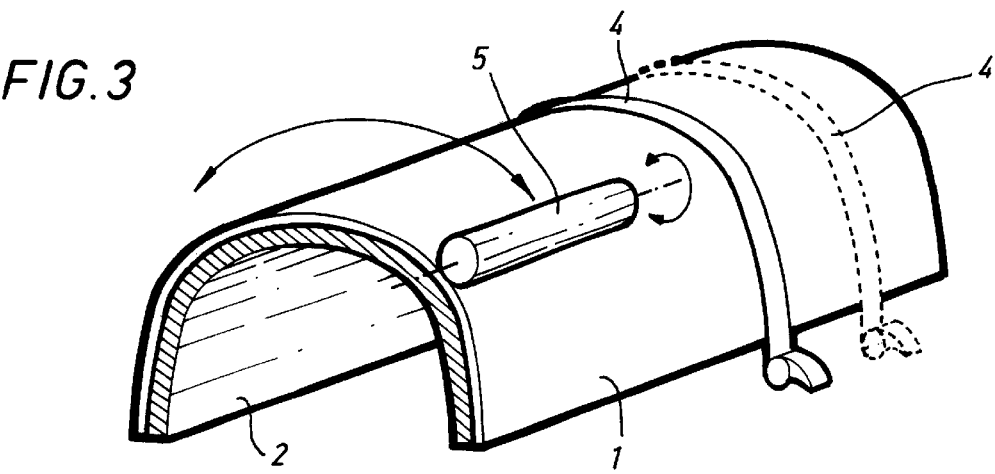
Figure 4:
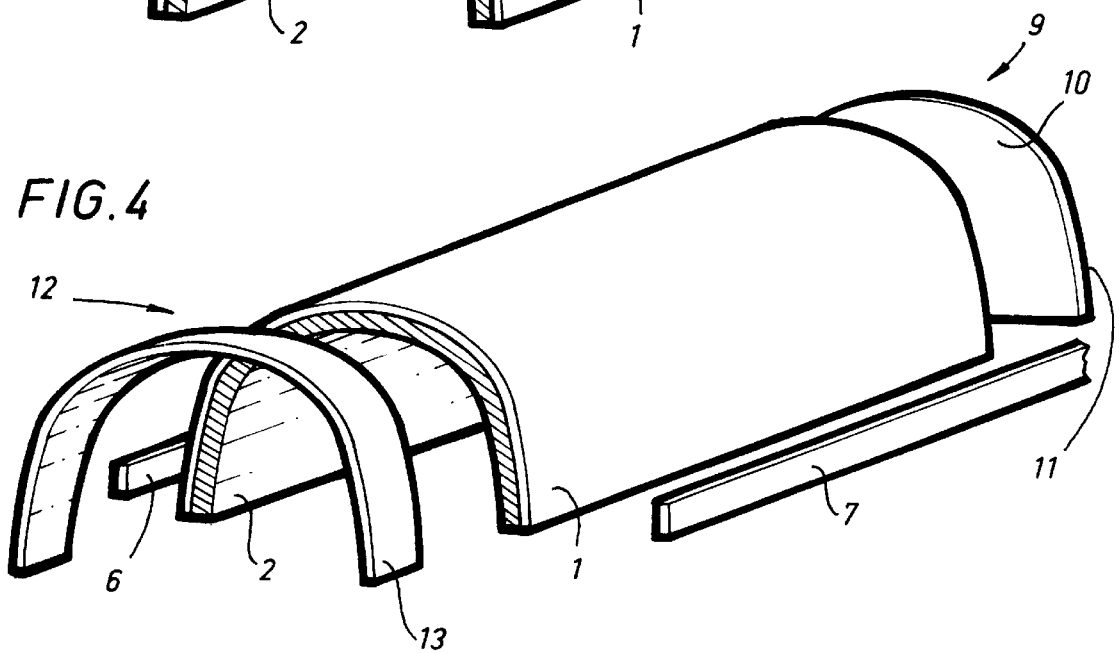
Figure 5:
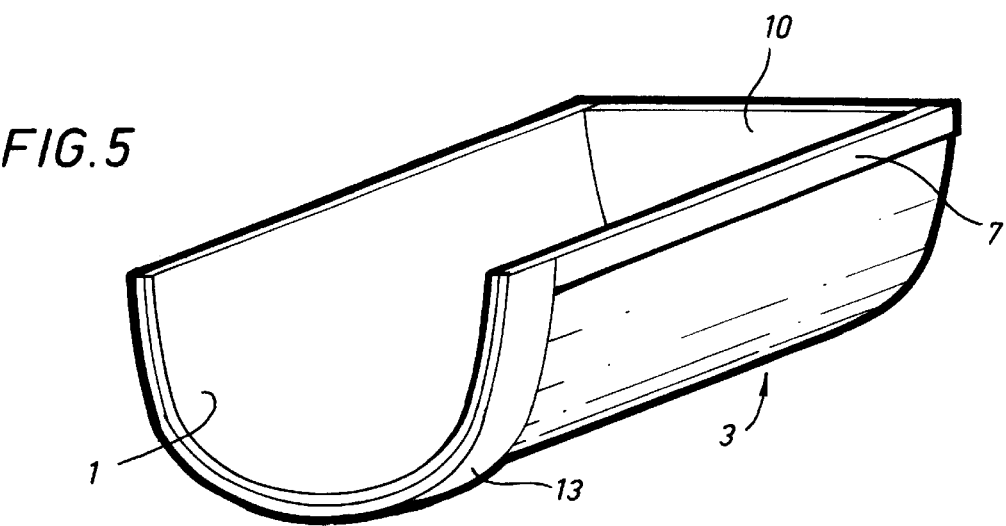
Figure 6:
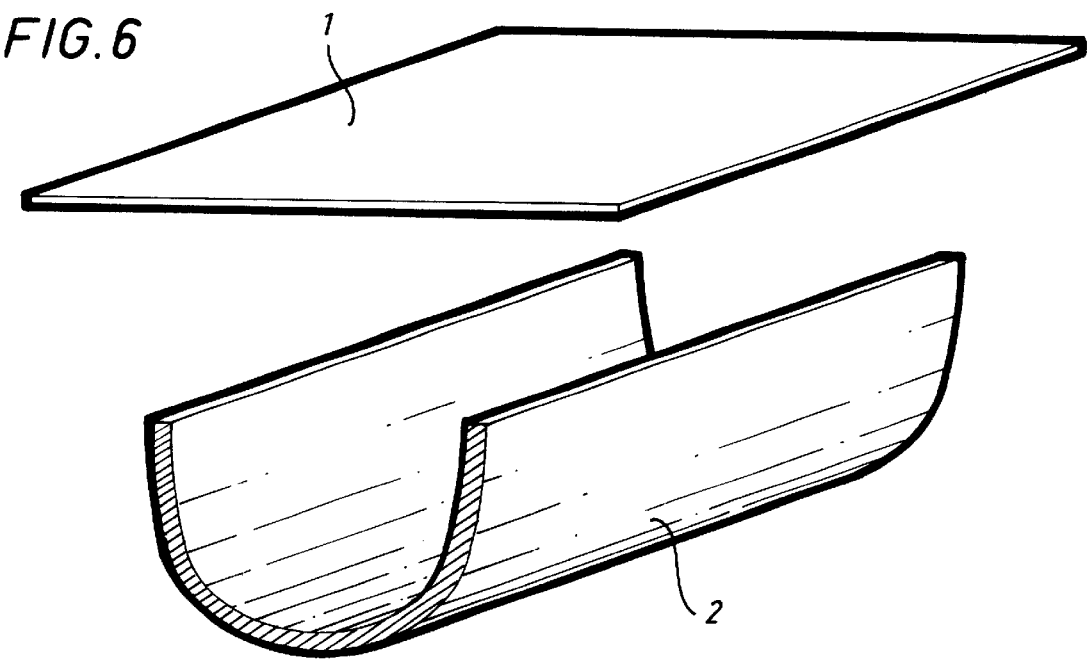
FIGS. 6 through 13 are schematic illustrations of a second variation using a concave form.
Figure 7:
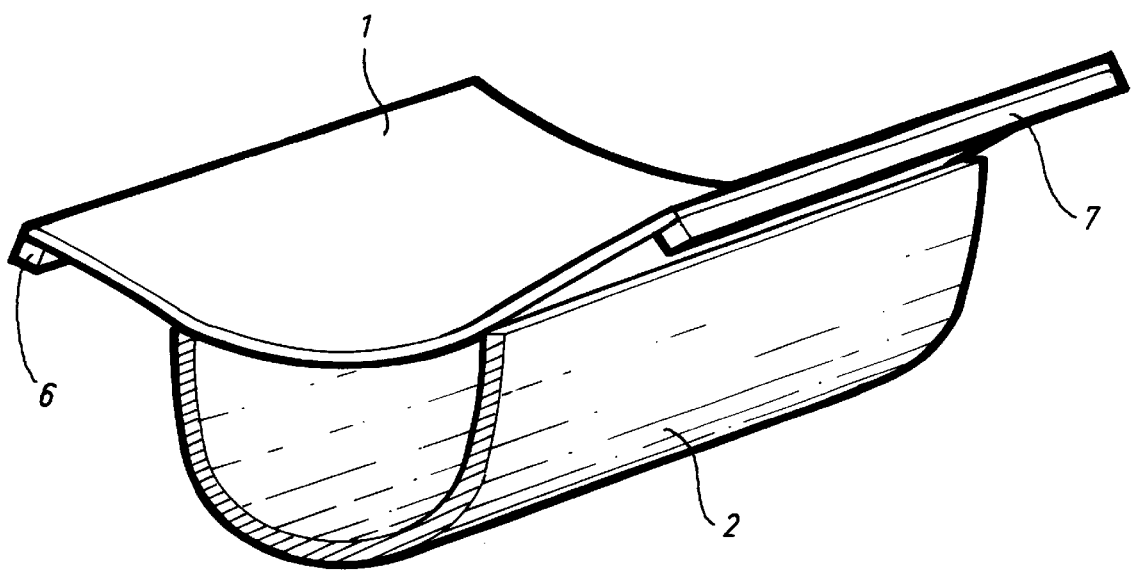
Figure 8:
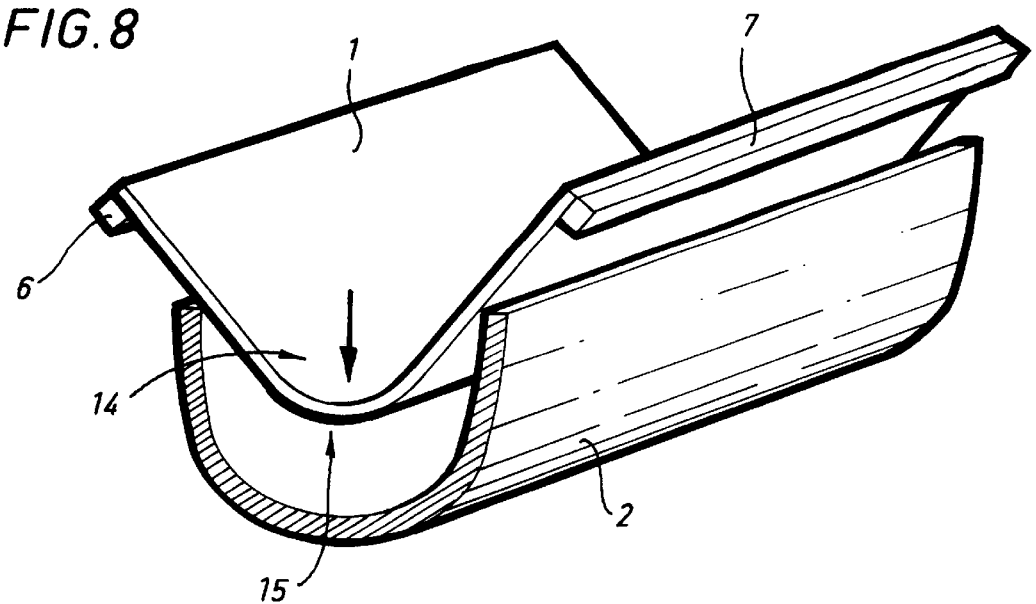
Figure 9:
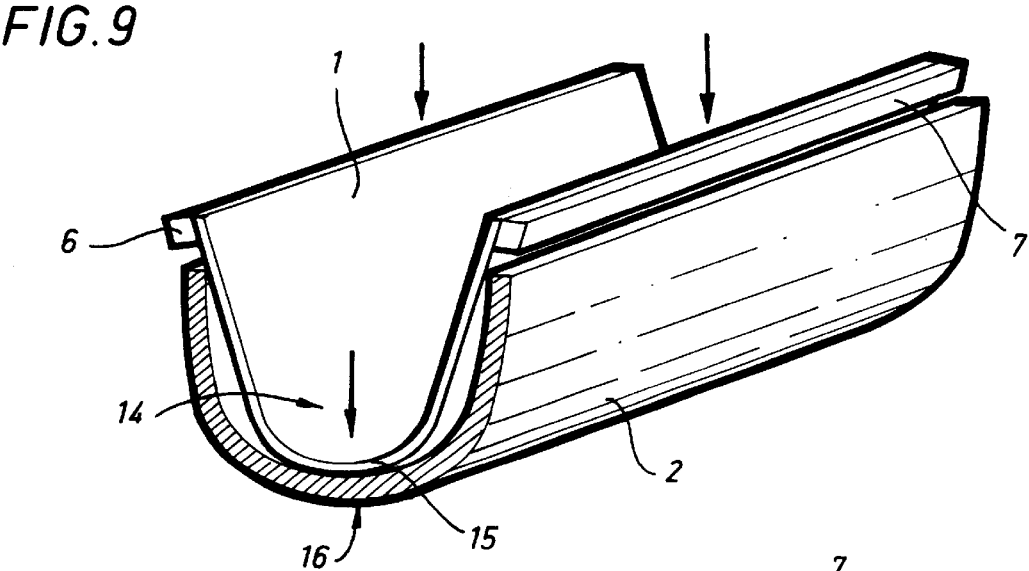
Figure 10:
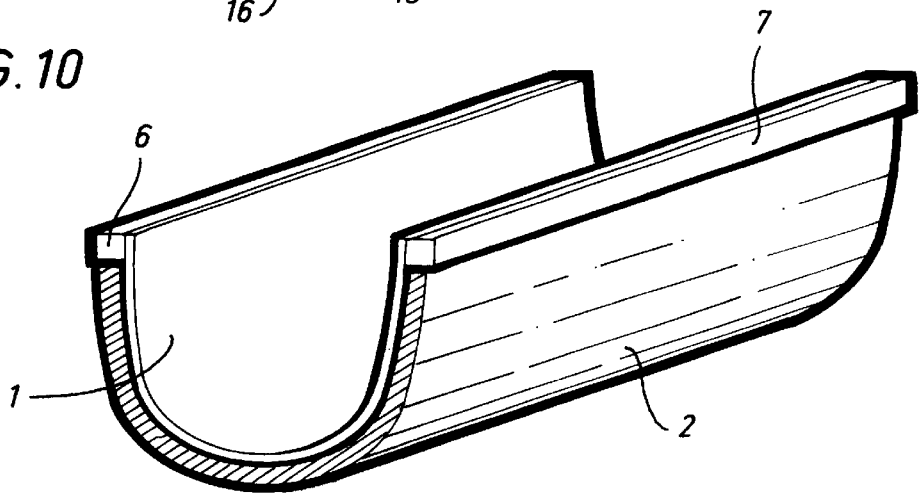
Figure 11:
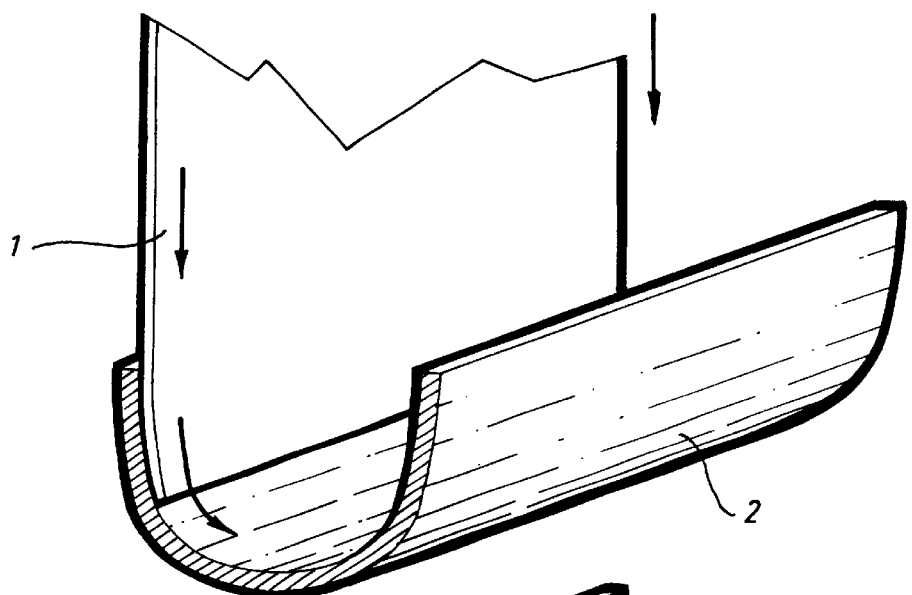
Figure 12:
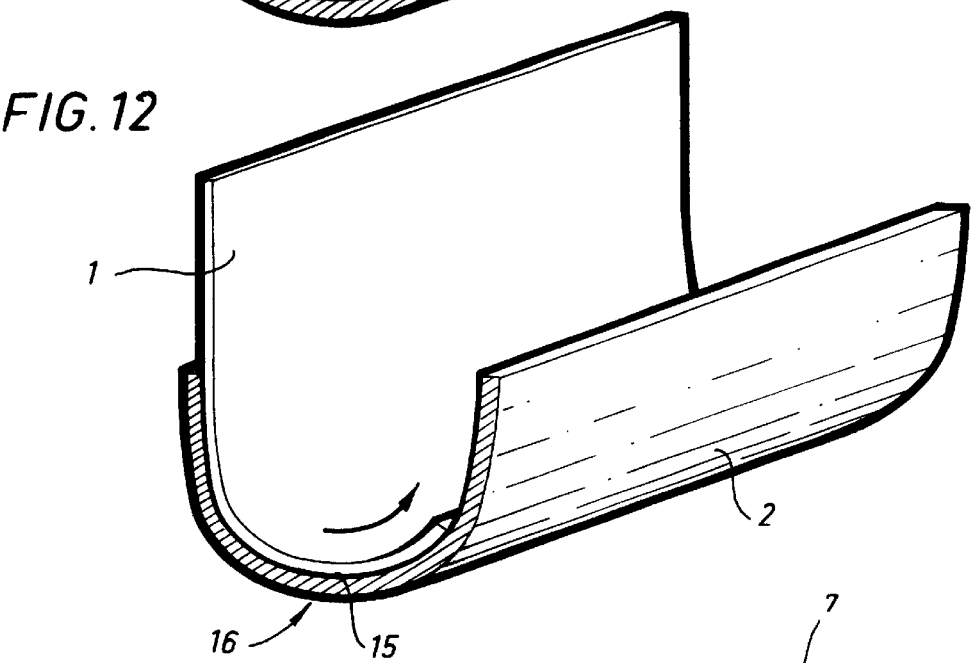
Figure 13:
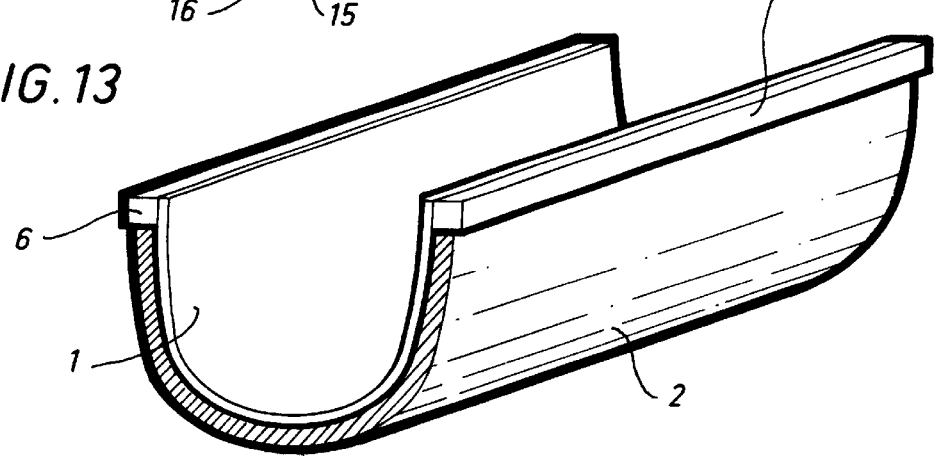
Figure 14:
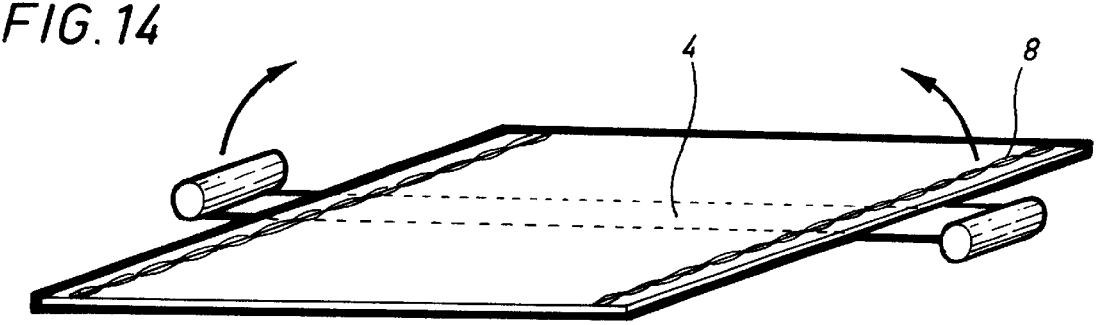
FIGS. 14 through 17 are schematic illustrations of a third method called the clamping method.
Figure 15:
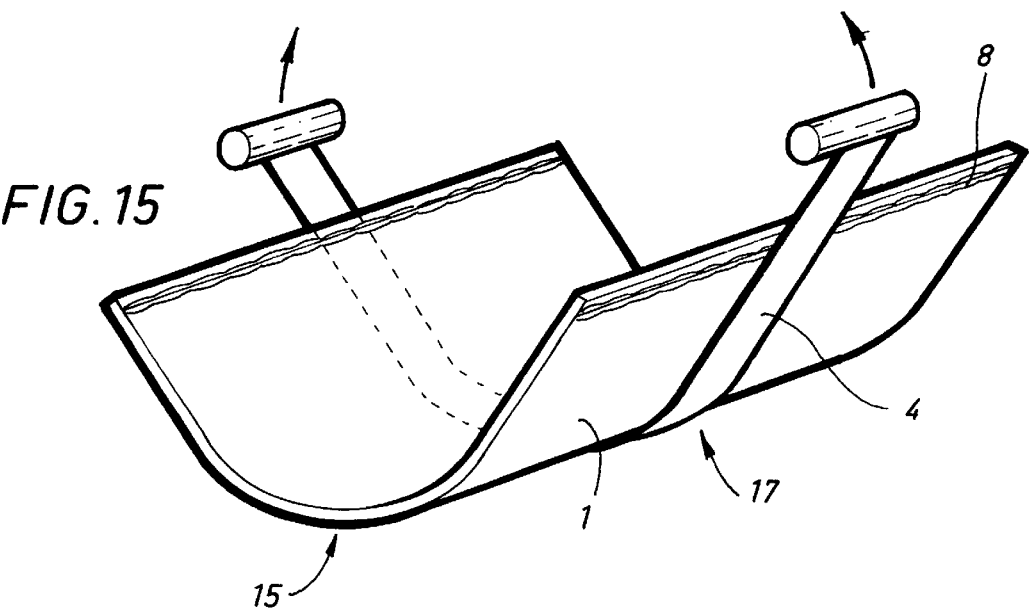
Figure 16:
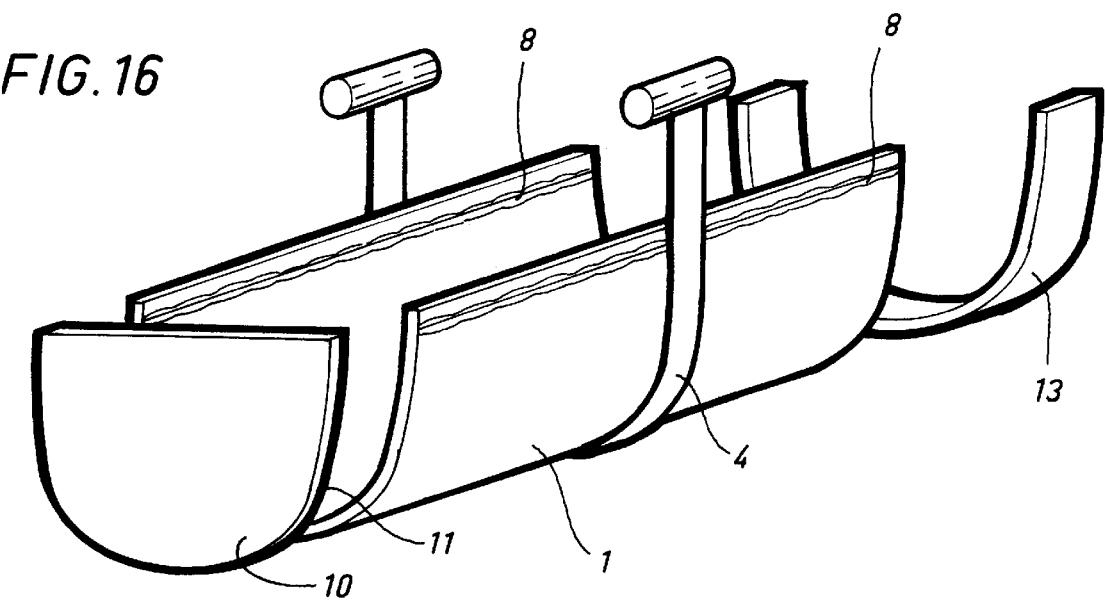
Figure 17:
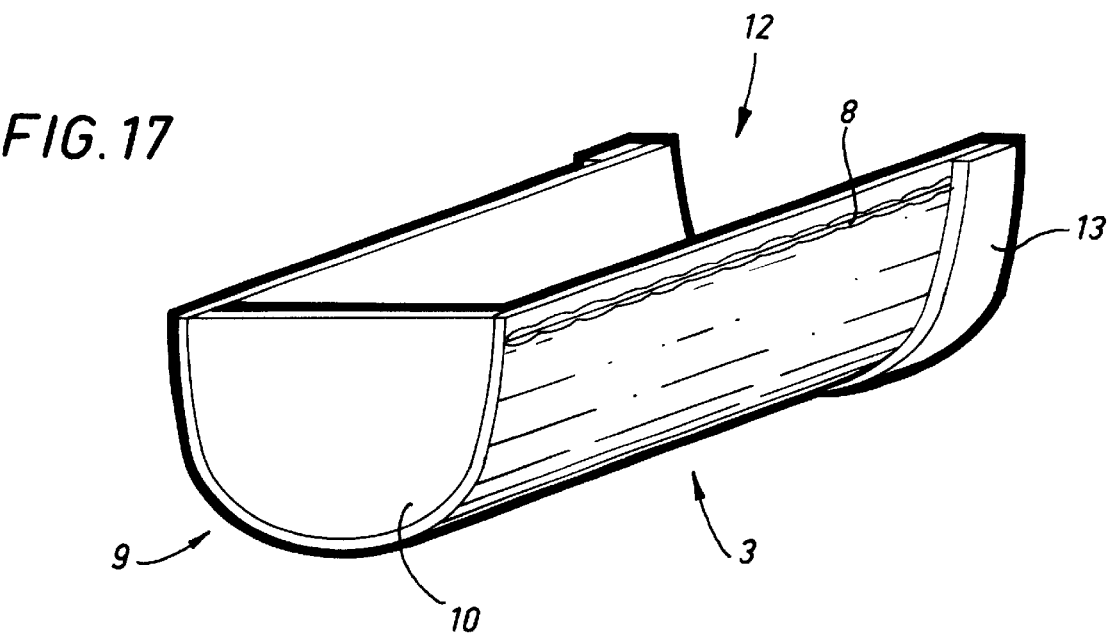

The invention features three methods of curving the metal: a first method in which it is applied to a form, a second method in which it is introduced into a form; and a third method in which it is clamped.

Method Using Application to a Form

This method consists of shifting and then applying the entire surface of a large sheet of metal 1 or a considerable portion thereof onto the lateral surface of a form or a counter-form 2 which approximates, with some slight differences, the concave shape of the skip body 3 to be produced (FIGS. 1 through 5).

The metal is applied to this counter-form using any suitable method of holding or applying it: straps 4, movable pressure wheels or rollers 5, cylinders, chains.

The edges or verge portions 6 or 7 may be formed either before or after the metal is passed along form 2.

If they are made first, they can be used as handles for holding it in place.

The verge portions can be made rigid either by the formation of one or more ribs, creases, or other deformations 8, or by mechanical, thermal, or chemical treatment.

While the metal is held in place on form 2, for example, by straps 4, one end is reinforced and the other end is sealed.

To do this, a rigid transverse wall or sealing plate 10 is soldered onto one of the extremities 9, generally the front extremity, which plate has a profile 11 that corresponds exactly to the shape of body 3 of the resulting skip. The Extremity, when immobilized in this way, serves to make the length of the body rigid.

The other extremity 12 is then stiffened, which usually is used as a temporarily sealed opening and for discharging cargo when in the inclined unloading position.

Various reinforcement means are used to achieve this. They may consist of adding a reinforcement lining 13 to a predetermined longitudinal portion of the skip body, adding a compartment, or joining a reinforcing tube or other rigid element of adequate weight and thickness.

According to this method, there are some differences in shape between the form and the definitive profile.

It is preferable to pre-bend the form to a certain extent, that is, making it slightly more concave in the lower central portion to accommodate the elasticity of the steel and the its tendency to resume a flat exterior shape.

In this way, an allowance is made for ultimate deformations in the skip body.

Introduction Inside a Form

According to this method, the sheet 1 of metal, having been produced by seaming or some other means, is held by its longitudinal edges using any floating or movable means to contact, for example, the edges or verge portions 6 or 7 which are preferably attached after the longitudinal edges have been attached (FIGS. 6 through 13).

As before, the edges of the verge portions may be made more rigid either by the formation of longitudinal ribs, creases, or other deformations, or by mechanical, thermal, or chemical treatment.

The metal is introduced inside the form, which has the concave portion facing upward. Next a specially shaped stamp or die 14 is used (shown by an arrow in the drawings) which causes the sheet 1 of metal to forcibly engage by means of the vertical pressure from the central longitudinal portion of the stamp onto the central longitudinal area 15 of the sheet of metal, while the longitudinal edges still remain vertical. While stamp 14 is being lowered, the longitudinal edges of the metal move toward each other until the sheet of metal is pressed tightly against the interior surface of form 2 and the exterior surface of the stamp (FIGS. 6 through 10).

The sheet of metal is compressed between these two shapes and assumes the concave shape of the form.

The sheet of metal may also be introduced by sliding it along the interior surface 16 of form 2 (FIG. 11) while pushing and/or pulling it downward by its two longitudinal edges. If necessary, it may be pushed down while constraining it against the interior lateral surface of the form.

While maintaining this pressure, both extremities of the partially completed skip body are sealed and closed or reinforced in the same way as before.

The sheet of steel may also be introduced into the form by pressing the two edges or the two verge portions toward the longitudinal edges of the form.

In that case, the metal is stiffened either immediately or after shaping along its longitudinal edges with verge portions 6 or 7 or suitable longitudinal stiffening deformations.

An advantage of this method is that it shapes the skip body in its normal usage position, eliminating the need to turn it over when the operation is complete.

Clamping Method

With this method shown in FIGS. 14 through 17, no form is used.

A large sheet 1 of metal is used, or a sheet of metal of the required dimensions is made by joining several smaller sheets.

In this case, the upper extremities of skip body 3 are next stiffened either, by attaching edges or verge portions 6 or 7 or by longitudinal deformation of the sheet to provide rigidity.

As before, the verge sections may also be longitudinally reinforced either by forming ribs, creases, or other longitudinal deformations, or by mechanical, thermal, or chemical treatment.

The length of the sheet of metal is then clamped by an exterior clamping means 17, such as straps or similar means.

Clamping means that the two lateral edges are pushed toward each other up to a certain point.

Next, sealing plate 10 is placed at one of the extremities 9 and used to form the definitive shape.

The plate has previously been cut to the identical shape of the finished product.

Next, the clamping means are either tightened or released locally to form the shape of the open end around profile edge 11 of sealing plate 10 and its edges are gradually soldered to the corresponding edges of the extremity 9 of skip body 3.

The other extremity 12 is reinforced using a preform in a manner similar to the method using a shaping form.

When the other extremity has been stiffened, clamping means 17 are released.

In this instance, the upper extremities of the skip body are then stiffened by attaching verge sections 6 or 7 or by stiffening it longitudinally.

Mechanical Treatment

Figure 18:
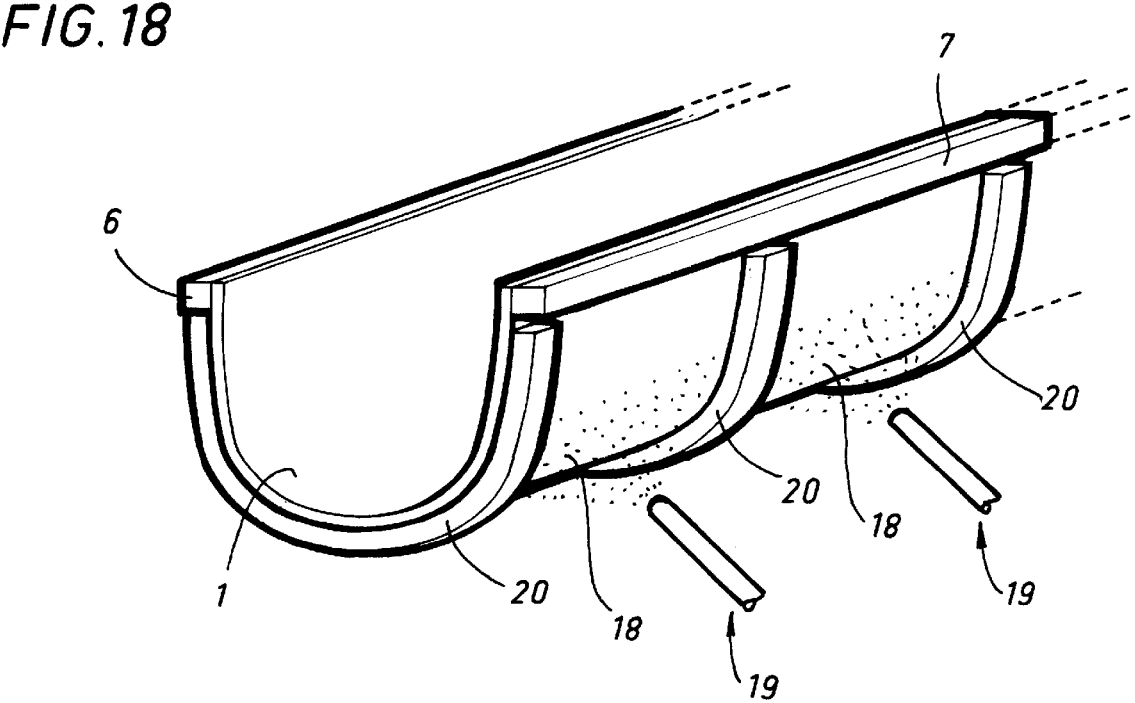
FIG. 18 shows an example of mechanical treatment.

A variation of the method is to treat the most broadly curved portions of the sides( 18 of skip body 3 with a pressurized spray of metal particles, gravel or other hard particles from nozzles 19, using a granulating or hammering procedure along the length of the skip body to improve its shape and maintain its form (FIG. 18).

This mechanical effect has the Advantage of relaxing the surface material, that is, stretching the fibers of the exterior metal skin and thus neutralizing its tendency to resume its initial flat shape. It also offers the advantage of providing anti-corrosion protection under pressure.

This mechanical treatment can take place from the outside while the metal is still inside the form, which would have openings for this purpose, for example, a perforated structure or one with open sections separated by curved elements such as arches 20 shown in FIG. 18.

What is claimed is:

1. A method of forming a skip body having a continuous concave curved cross-section without any crease being formed therein, the skip body being manufactured from a sheet of metal, and the method comprising the steps of:

forming the sheet of metal (1) from one of a single piece of metal and a plurality of pieces of metal joined together with the sheet of metal (1) having a first and second opposed longitudinal edges and first and second opposed transverse edges;

curving the sheet of metal (1) inwardly, via use of shaping means (2, 4, 5), into a configuration approximating a final desired shape for the skip body (3);

securing a sealing plate (10) to a first opposed extremity (9) of the inwardly curved single sheet of metal (1), while maintaining a curving pressure applied to the sheet of metal (1), to seal the first opposed extremity (9), and the sealing plate (10) having a curved perimeter contour (11) defining a concave final shape to be retained by the skip body (3) to be manufactured;

stiffening the second transverse edge of sheet of metal (1) with a stiffening member (13) having a desired concave final shape to be retained by the skip body (3) to be manufactured, while maintaining a curving pressure applied to the sheet of metal (1);

stiffening the first and the second longitudinal edges of the sheet of metal (1), extending between the first and second opposed extremities (9, 12), one of before the single sheet of metal (1) is curved inwardly and following curving the single sheet of metal (1) inwardly;

relaxing the pressure applied to the single sheet of metal (1); and removing the skip body (3) from the shaping means whereby the skip body (3) has the desired concave final shape.

2. The method of forming the skip body according to claim 1, further comprising the step of employing a form (2), pre-molded into a desired final shape for the skip body, as the shaping means.

3. The method of forming the skip body according to claim 1, further comprising the step of curving the sheet of metal (1) inward by engaging the sheet of metal (1) with an exterior surface of a convex form (2).

4. The method of forming the skip body according to claim 1, further comprising the steps of curving the sheet of metal (1) inward by engaging the sheet of metal (1) with an inwardly facing concave interior surface of a concave form (2) and maintaining the sheet of metal (1) in engagement with the concave interior surface of a concave form (2) during manufacturing the skip body (3).

5. The method of forming the skip body according to claim 1, further comprising the step of engaging the sheet of metal (1) with an inwardly facing concave interior surface (16) of a concave form (2) by sliding the sheet of metal (1) along said concave interior surface of the concave form (2).

6. The method of forming the skip body according to claim 1, further comprising the step of engaging the sheet of metal (1) with an inwardly facing concave interior surface (16) of a concave form (2) by pushing a central longitudinal area of the sheet of metal (1) toward a central longitudinal portion of the concave interior surface (16) of the concave form (2).

7. The method of forming the skip body according to claim 1, further comprising the step of engaging the sheet of metal (1) with a concave interior surface of a concave form (2) by forcing the first and the second opposed longitudinal edges of the sheet of metal (1) and two opposed verge portions (6, 7) toward longitudinal edges of the concave form (2).

8. The method of forming the skip body according to claim 1, further comprising the step of stiffening the first and second opposed longitudinal edges of the sheet of metal (1) prior to the step of curving the single sheet of metal (1) inwardly.

9. The method of forming the skip body according to claim 1, further comprising the step of attaching two opposed verge portions (6, 7) to the first and second opposed longitudinal edges prior to the step of curving the single sheet of metal (1) inwardly.

10. The method of forming the skip body according to claim 9, further comprising the step of providing a mechanical treatment to the skip body following attachment to the two opposed verge portions to the skip body (3).

11. The method of forming the skip body according to claim 10, wherein the mechanical treatment step further comprises the step of spraying one of grain particles of a hard material and solid particles of a hard material on a desired surface of the skip body (3).

12. The method of forming the skip body according to claim 1, further comprising the step of relieving surface stress in the sheet of metal (1) by applying a mechanical treatment to curved areas of the sheet of metal (1).

13. The method of forming the skip body according to claim 1, further comprising the step of forming at least one longitudinal deformation (8) in the sheet of metal (1) to stiffen the longitudinal edges of the sheet of metal (1).

14. The method of forming the skip body according to claim 1, further comprising the step of stiffening the first and the second longitudinal edges of the sheet of metal (1) by a mechanical treatment of the sheet of metal (1).

15. The method of forming the skip body according to claim 1, further comprising the step of stiffening the first and the second longitudinal edges of the sheet of metal (1) by a thermal treatment of the sheet of metal (1).

16. The method of forming the skip body according to claim 1, further comprising the step of stiffening the first and the second longitudinal edges of the sheet of metal (1) by a chemical treatment of the sheet of metal (1).

17. A method of forming a skip body having a continuous concave curved cross-section without any crease being formed therein, the skip body being manufactured from a sheet of metal, and the method comprising the steps of:

forming the sheet of metal (1) from one of a single piece of metal and a plurality of pieces of metal joined together with the sheet of metal (1) having a first and second opposed longitudinal edges and first and second opposed transverse edges;

curving the sheet of metal (1) inwardly, by engaging the sheet of metal (1) with a curved surface of a curved form (2), into a configuration approximating a final desired shape for the skip body (3) to be manufactured solely by bending of the sheet of metal (1); and maintaining the sheet of metal (1) in engagement with the curved surface of the concave form (2) during manufacturing the skip body (3);

securing a sealing plate (10) to a first opposed extremity (9) of the inwardly curved single sheet of metal (1) to seal the first opposed extremity (9) while maintaining a curving pressure applied to the sheet of metal (1), the sealing plate (10) having a curved perimeter contour (11) defining a final shape to be retained by the skip body (3) to be manufactured;

stiffening the second transverse edge of sheet of metal (1), located adjacent a second first opposed extremity (12) of the sheet of metal (1), with a stiffening member (13) having a desired concave final shape to be retained by the skip body (3) to be manufactured while maintaining a curving pressure applied to the sheet of metal (1);

stiffening the first and the second longitudinal edges of the sheet of metal (1) extending between the first and second opposed extremities (9, 12); of metal (1); and maintaining the sheet of metal (1) in engagement with the curved surface of the concave form (2) during manufacturing the skip body (3);

securing a sealing plate (10) to a first opposed extremity (9) of the inwardly curved single sheet of metal (1) to seal the first opposed extremily (9) while maintaining a curving pressure applied to the sheet of metal (1), the sealing plate (10) having a curved perimeter contour (11) defining a final shape to be retained by the skip body (3) to be amnufactured;

stiffening the second transverse edge of sheet of metal (1), located adjacent a second first opposed extremity (12) of the sheet of metal (1), with a stiffening member (13) having a desired concave final shape to be retained by the skip body (3) to be manufactrured while maintaining a curving pressure applied to the sheet of metal (1);

stiffening the first and the second longitudinal edges of the sheet of metal (1) extending between the first and second opposed extremities (9, 12);

relaxing a pressure applied by the curved form (2) to the single sheet of metal (1); and removing the skip body (3) from the curved form whereby the skip body (3) has the desired concave final shape.

18. A method of forming a skip body having a continuous concave curved cross-section without any crease being formed therein with the skip body being manufactured from a sheet of metal, the method comprising the steps of:

forming the sheet of metal (1) from one of a single piece of resilient metal and a plurality of pieces of metal joined together with the sheet of metal (1), the sheet of metal (1) having a first and second opposed longitudinal edges and first and second opposed transverse edges;

curving the sheet of metal (1) inwardly, by engaging the sheet of metal (1) with a curved surface of a curved form (2), into a configuration approximating a final desired shape for the skip body (3) to be manufactured; and maintaining the sheet of metal (1) in engagement with the curved surface of the curved form (2) during manufacturing the skip body (3);

securing a sealing plate (10) to a first opposed extremity (9) of the inwardly curved single sheet of metal (1) to seal the first opposed extremity (9) while maintaining a curving pressure applied to the sheet of metal (1), the sealing plate (10) having a curved perimeter contour (11) defining a concave final shape to be retained by the skip body (3) to be manufactured, and attaching the first transverse edge adjacent the first opposed extremity (9) of the sheet of metal (1) to the curved perimeter contour of the sealing plate (10);

stiffening the second transverse edge of sheet of metal (1), located adjacent a second first opposed extremity (12) of the sheet of metal (1), with a stiffening member (13) having a desired concave final shape to be retained by the skip body (3), to be manufactured while maintaining a curving pressure applied to the sheet of metal (1);

stiffening the first and the second longitudinal edges of the sheet of metal (1) extending between the first and second opposed extremities (9, 12); and removing the skip body (3) from the curved form whereby the skip body (3) has the desired concave final shape.

19. The method of forming the skip body according to claim 18, further comprising the step of engaging the sheet of metal (1) with an inwardly facing curved surface (16) of the curved form (2) by engaging the first longitudinal edge of the sheet of material (1) with a first longitudinal edge of the curved form (2) and sliding the sheet of metal (1) along the inwardly facing concave surface (16) of the curved form (2) so that the first longitudinal edge of the sheet of material (1) is located adjacent a second longitudinal edge of the curved form (2), following completion of the sliding motion of the sheet of metal (1), and the sheet of metal (1) is formed into a configuration approximating the final desired shape for the skip body (3) to be manufactured.

20. The method of forming the skip body according to claim 18, further comprising the step of engaging the sheet of metal (1) with an inwardly facing concave interior surface (16) of a concave form (2) by pushing a central longitudinal area of the sheet of metal (1) toward a central longitudinal portion of the concave interior surface (16) of the concave form (2) so that, following completion of the pushing motion of the sheet of metal (1), the sheet of metal (1) is formed into a configuration approximating the final desired shape for the skip body (3) to be manufactured.

21. The method of forming the skip body according to claim 18, further comprising the step of engaging the sheet of metal (1) with an outwardly facing curved surface of the curved form (2) by forcing the first and the second opposed longitudinal edges of the sheet of metal (1) and two opposed verge portions (6, 7) toward longitudinal edges of the concave form (2) so that, following completion of the forcing motion of the sheet of metal (1), the sheet of metal (1) is formed into a configuration approximating the final desired shape for the skip body (3) to be manufactured.

* * * * *